United States Patent [19]

Hosoda et al.

[11] Patent Number: 4,656,212

[45] Date of Patent: Apr. 7, 1987

[54] THERMOPLASTIC RESIN COMPOSITION

[75] Inventors: Atsushi Hosoda, Chiba; Tadao Satoh; Takehisa Mizuno, both of Ichihara, all of Japan

[73] Assignee: Dainippon Ink & Chemicals, Inc., Tokyo, Japan

[21] Appl. No.: 819,034

[22] Filed: Jan. 15, 1986

[30] Foreign Application Priority Data

Jan. 16, 1985 [JP] Japan ................................ 60-4038

[51] Int. Cl.$^4$ .............................................. C08K 5/24
[52] U.S. Cl. .................................. 524/269; 524/504; 525/78
[58] Field of Search ................. 524/269, 504; 525/78

[56] References Cited

U.S. PATENT DOCUMENTS

| | | | |
|---|---|---|---|
| 2,720,495 | 10/1955 | Phreaner | 524/269 |
| 3,046,239 | 7/1962 | Calvert | 524/269 |
| 3,919,157 | 11/1975 | Ide et al. | 524/269 |
| 4,476,267 | 10/1984 | Barda et al. | 524/269 |

FOREIGN PATENT DOCUMENTS

| | | | |
|---|---|---|---|
| 50-1709 | 1/1975 | Japan | 524/269 |
| 56-104953 | 8/1981 | Japan | 524/269 |
| 57-187346 | 11/1982 | Japan | 524/269 |
| 58-096641 | 6/1983 | Japan . | |
| 60-106818 | 6/1985 | Japan . | |
| 0905235 | 2/1982 | U.S.S.R. | 524/269 |

*Primary Examiner*—Joseph L. Schofer
*Assistant Examiner*—N. Sarofim
*Attorney, Agent, or Firm*—Sherman and Shalloway

[57] ABSTRACT

A thermoplastic resin composition having excellent impact strength and high heat distortion temperatures consisting essentially of (A) 10 to 90 parts by weight of a styrene-methacrylic acid type copolymer resin selected from a styrene/methacrylic acid copolymer resin obtained by polymerizing 97 to 65% by weight of styrene and 3 to 35% by weight of methacrylic acid and a styrene/methyl methacrylate/methacrylic acid copolymer resin obtained by polymerizing 48.6 to 64.9% by weight of styrene, 48.4 to 0.1% by weight of methyl methacrylate and 3 to 35% by weight of methacrylic acid, (B) 90 to 10 parts by weight of a graft copolymer resin obtained by polymerizing 70 to 20% by weight of methyl methacrylate or a monomeric mixture composed of from less than 100 to 20% by weight of methyl methacrylate and from more than 0 to 80% by weight of styrene in the presence of 30 to 80% by weight of a rubbery polymer, and (C) 0.001 to 0.2% by weight as silicon, based on the total weight of (A) and (B), of an organopolysiloxane.

12 Claims, No Drawings

THERMOPLASTIC RESIN COMPOSITION

This invention relates to a novel and useful thermoplastic resin composition. More specifically, this invention relates to a resin composition comprising a specific styrene/methacrylic acid type copolymer resin, a specific graft copolymer resin and an organopolysiloxane as essential ingredients, which can be used mainly as a molding material and has a high heat distortion temperature and excellent impact strength.

To improve the impact strength of styrene-type resins, rubber-modified polystyrene resins containing dispersed particles of a rubbery polymer have previously been produced in great quantities, and molded articles of these high-impact polystyrene resins have also gained widespread acceptance.

The rubber-modified polystyrene has by far the lowest heat resistance among various thermoplastic resins. In an attempt to improve the heat resistance of the rubber-modified polystyrene, a rubber-modified styrene/maleic anhydride copolymer resin and a rubber-modified styrene/alphamethylstyrene/acrylonitrile copolymer resin have been provided, but they have not proved to be entirely satisfactory. If it is desired to produce the former resin as a molding material by copolymerizing a small amount of maleic anhydride with styrene in a random manner, a special apparatus and a special technique are required because the alternate polymerizability of the two monomers is high. Moreover, the production of the former resin has restrictions in manufacturing technique. For example, aqueous polymerization methods such as a suspension or emulsion polymerization method cannot be used for its production. The production of the latter resin, on the other hand, has the defect that the reaction is relatively slow, the heat resistance of the resulting resin is insufficient, and the resulting resin itself is liable to be colored.

The present inventors previously filed a patent application (Japanese Laid-Open Patent Publication No. 106818/1985) for a rubber-modified styrene/methacrylic acid copolymer resin as a heat-resistant high-impact resin which eliminates the various defects of the aforesaid conventional resins. This patent document discloses that a rubber-modified styrene/methacrylic acid copolymer resin is produced by melting a styrene/methacrylic acid copolymer resin (to be sometimes referred to as SMAA resin) and a graft copolymer resin (to be referred to as SMAA-type graft copolymer resin) obtained by polymerizing styrene and methacrylic acid in the presence of a rubbery polymer to graft styrene and methacrylic acid partly to the rubbery polymer.

The SMAA-type graft copolymer resin described in the above-cited Japanese patent document is pepared by an emulsion polymerization method. This method, however, has the disadvantage that methacrylic acid used as one starting material makes the emulsion system unstable and that since methacrylic acid is used, an emulsifier for the reaction system must be one having poor biodegradability such as sodium alkylbenzenesulfonates, and therefore the treatment of the waste water becomes difficult.

It is an object of this invention to provide means for overcoming the defects or disadvantages of the prior art discussed above.

In order to achieve this object, the present inventors worked extensively, and have found a method whereby without using methacrylic acid as a constituent of the SMAA-type graft copolymer resin, impact strength can be imparted to SMAA resin while retaining its inherent heat resistance, and at the same time, by jointly using a particular organopolysiloxane, the impact resistance of SMAA resin can be further improved.

Investigations of the present inventors have shown unexpectedly that a graft copolymer resin obtained by graft-copolymerizing rubbery polymer with methyl methacrylate or a mixture of it with styrene (to be referred to as the MBS-type graft copolymer resin) is suitable as an impact strength imparting agent for SMAA resin because it forms a homogeneous blend with SMAA resin in spite of the differences in the monomer components constituting the grafted portion, and greatly increases the impact strength of SMAA resin. It has also been found by the present inventors that even when the MBS-type graft copolymer resin is to be produced by an emulsion polymerization method, there is no restriction on the type of the emulsifier used or the method of adding the monomers, and the conventional techniques of emulsion polymerization can be directly applied to the production of the MBS-type graft copolymer resin. It has further been found in accordance with this invention that inclusion of a small amount of an organopolysiloxane in a composition comprising the SMAA resin and the MBS-type graft copolymer resin leads to a further improvement in impact strength.

According to this invention, there is provided a thermoplastic resin composition comprising as essential ingredients (A) 10 to 90 parts by weight of a styrene-methacrylic acid type copolymer resin selected from a styrene/methacrylic acid copolymer resin obtained by polymerizing 97 to 65% by weight of styrene and 3 to 35% by weight of methacrylic acid and a styrene/methyl methacrylate/methacrylic acid copolymer resin obtained by polymerizing 48.6 to 64.9% by weight of styrene, 48.4 to 0.1% by weight of methyl methacrylate and 3 to 35% by weight of methacrylic acid, (B) 90 to 10 parts by weight of a graft copolymer resin obtained by polymerizing 70 to 20% by weight [based on the resulting graft copolymer (B)] of methyl methacrylate or a monomeric mixture composed of from less than 100 to 20% by weight of methyl methacrylate and from more than 0 to 80% by weight of styrene in the presence of 30 to 80% by weight [based on the resulting graft copolymer (B)] of a rubbery polymer, and (C) 0.0001 to 0.2% by weight as silicon, based on the total weight of (A) and (B), of an organopolysiloxane.

The resin (A), i.e. the styrene/methacrylic acid copolymer resin or the styrene/methyl methacrylate/methacrylic acid copolymer, denotes a copolymer resin obtained by thermally polymerizing 97 to 65% by weight, preferably 93 to 70% by weight, of styrene and 3 to 35% by weight, preferably 7 to 30% by weight, of methacrylic acid, or 48.6 to 64.9% by weight, preferably 50 to 60% by weight, of styrene, 48.4 to 0.1% by weight, preferably 43 to 10% by weight, of methyl methacrylate and 3 to 35% by weight, preferably 7 to 30% by weight, of methacrylic acid in the presence or absence of a polymerization initiator, as by the method described in the specification of Japanese Laid-Open Patent Publication No. 96641/1983.

If the amount of methacryliic acid is less than 3% by weight, the resulting resin (A) does not have high heat resistance. If it exceeds 35% by weight, the resin (A) has lowered flowability and reduced compatibility with the graft copolymer resin (B), and consequently, the impact resistance of the resulting composition is reduced.

In the resin (A), less than 50% by weight of styrene may be replaced by methyl methacrylate. In other words, the styrene/methyl methacrylate/methacrylic acid copolymer resin obtained by polymerizing 48.6 to 64.9% by weight of styrene, 48.4 to 0.1% by weight of methyl methacrylate and 3 to 35% by weight of methacrylic acid may be used as the resin (A). This replacement increases the affinity of the resin (A) for the graft copolymer resin (B) and serves to give a resin composition having improved impact strength and heat resistance. If the amount of methyl methacrylate replacing styrene exceeds 50% by weight, the flowability of the resulting resin is undesirably reduced.

The graft copolymer resin (B) denotes a resin obtained by polymerizing methyl methacrylate or a monomeric mixture composed of from less than 100 to 20% by weight, preferably 80 to 40% by weight, of methyl methacrylate and from more than 0 to 80% by weight, preferably 20 to 60% by weight, of styrene in the presence of 30 to 80% by weight, preferably 40 to 70% by weight, of a rubbery polymer.

Examples of the rubbery polymer include a homopolymer of butadiene or copolymers of butadiene with vinyl monomers copolymerizable with it (i.e., diene-type rubbers) such as polybutadiene (PBD), acrylonitrile/butadiene copolymer rubber (NBR) and styrene/butadiene copolymer rubber (SBR); homopolymers of acrylic esters or copolymers of acrylic esters with other vinyl monomers copolymerizable therewith, such as poly(propyl acrylate) and poly(butyl acrylate); and ethylene/propylene/non-conjugated diene copolymers (EPDM).

If the proportion of the rubbery polymer is less than 30% by weight in the production of the graft copolymer resin (B), the heat resistance of the resulting composition is not sufficient. If it exceeds 80% by weight, the resulting composition has reduced mechanical strength and undesirable surface characteristics such as reduced gloss.

When methyl methacrylate and styrene are used together as the grafting component and the amount of methyl methacrylate is less than 20% by weight, the resulting composition has a lowered heat distortion temperature and reduced impact strength.

Conventional polymerization methods such as methods of emulsion polymerization, emulsion-suspension polymerization, solution polymerization and bulk polymerization can be directly applied to the preparation of the graft copolymer resin (B). The use of the emulsion polymerization method is very advantageous and preferred because it can give a resin having a high content of the rubbery polymer.

The organopolysiloxane (C) denotes a polymer having the structural units of the general formula

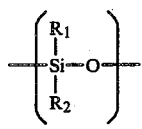

wherein $R_1$ and $R_2$ may be identical or different, and each represents an alkyl, aryl or aralkyl group.

The organopolysiloxane (C) may be a homopolymer composed only of the above structural units of one type, or may be a random, block or graft copolymer composed of the above structural units in a combination of two or more types.

Typical examples of the organopolysiloxane (C) are dimethylpolysiloxane, methylphenylpolysiloxane, diphenylpolysiloxane and methylbenzylpolysiloxane. Dimethylpolysiloxane is particularly preferred.

The organopolysiloxane (C) should have a boiling point of at least 120° C. and be thermally and chemically stable at temperatures employed for molding the resin composition. Organopolysiloxanes which meet this requirement generally have a viscosity of 10 to 100,000 centistokes, preferably 15 to 50,000 centistokes, especially preferably 100 to 10,000 centistokes.

The amount of the organopolysiloxane (C) used is 0.001 to 0.2% by weight, preferably 0.002 to 0.08% by weight, especially preferably 0.002 to 0.05% by weight, as silicon based on the weight of the rubber-modified SMAA-type resin composition [namely, the total weight of the ingredients (A) and (B)]. If it is less than 0.001% by weight, the desired impact strength of the composition of this invention cannot be obtained. If it exceeds 0.2% by weight, the impact strength of the composition no longer increases, and other mechanical strength properties, such as tensile strength, of the composition will be deteriorated.

The organopolysiloxane (C) may be added at a suitable time, for example during the preparation of the graft copolymer resin (B) (polymerization) or during the pelletization of a mixture of the ingredients (A) and (B) by extrusion. It is also possible to include the polysiloxane (C) in the ingredient (A) in advance.

The content (proportion added) of the ingredient (C) as silicon may be determined from the amount of the polysiloxane added, or by atomic absorptionometry of silicon atoms.

There is no particular restriction on the method of preparing the resin composition of this invention from the above ingredients. Usually, the composition is preferably prepared by melt-kneading them in a kneading machine such as an extruder or a kneader. During or after kneading, various additives such as hindered phenol-type antioxidants, heat stabilizers (e.g., phosphorus-type antioxidants), ultraviolet absorbers, light stabilizers, fire retardants, lubricants, coloring agents and pigments or various reinforcing agents or fillers such as glass or metal fibers may be incorporated in the composition as required.

Because of its excellent heat resistance and impact resistance, the thermoplastic resin composition of this invention finds a wide range of applications for example as automotive parts such as instrument panels, heater ducts and tail lamp housings; parts of household electrical appliances such as air-conditioner ducts, breaker covers, TV cabinets, hair curlers and iron handles; parts and accessories of office automation machines such as VTR tape cassettes, audio-tape cassettes, floppy disc cases and housings of office automation machines; optical instrument parts such as housings of cameras and cine-projectors, and slide magazines; food containers such as those used in electronic cooking stoves; and heat insulating materials such as heat insulating materials for building and construction, heat insulating materials for household heaters, and heat insulating materials for containers.

The following Referential Examples, Examples and Comparative Examples illustrate the present invention more specifically. All parts and percentages are by weight unless otherwise specified.

In the examples, the heat distortion temperature was measured in accordance with ASTM D-648-56. The impact strength was measured in accordance with ASTM D-256-56, method A. The melt flow rate (MFR) was measured in accordance with ASTM D-1238, condition 1 at 230° C. under a load of 3.8 kg.

REFERENTIAL EXAMPLES 1-6

Preparation of SMAA-type resin (A):

Resins (A-1) to (A-4), (A'-1) and (A'-2) having the compositions shown in Table 1 were prepared by the following methods.

REFERENTIAL EXAMPLE 1

A 5-liter autoclave equipped with a stirrer was charged with 2,000 g of distilled water, and 0.05 g of sodium laurylsulfate and 10 g of partially saponified polyvinyl alcohol as a suspension stabilizer were added and dissolved. Thereafter, 770 g of styrene, 230 g of methacrylic acid, 2 g of di-tert-butyl peroxyhexahydroterephthalate and 1 g of tert-butyl perbenzoate were successively charged. With stirring at a speed of 400 rpm, the mixture was heated to 90° C., and the monomers were polymerized in suspension for 10 hours, and then, the reaction was continued at 120° C. for 3 hours. The resulting granular copolymer was washed, dehydrated, and dried to give SMAA resin (A-1).

REFERENTIAL EXAMPLE 2

A granular SMAA resin (A-2) was prepared in the same way as in Referential Example 1 except that the amount of styrene was changed to 850 g and the amount of methacrylic acid, to 150 g.

REFERENTIAL EXAMPLE 3

A granular SMAA resin (A-3) was prepared in the same way as in Referential Example 1 except that the amount of styrene was changed to 900 g and the amount of methacrylic acid, to 100 g.

REFERENTIAL EXAMPLE 4

A granular SMAA resin (A-4) was prepared in the same way as in Referential Example 1 except that the amount of styrene was changed to 520 g and the amount of methacrylic acid, to 180 g, and 300 g of methyl methacrylate was additionally used.

REFERENTIAL EXAMPLE 5

A granular SMAA resin (A'-1) was prepared in the same way as in Referential Example 1 except that the amount of styrene was changed to 600 g and the amount of methacrylic acid, to 400 g.

REFERENTIAL EXAMPLE 6

A granular SMAA resin (A'-2) was prepared in the same way as in Referential Example 1 except that the amount of styrene was changed to 270 g and the amount of methacrylic acid, to 150 g, and 580 g of methyl methacrylate was additionally used.

REFERENTIAL EXAMPLES 7-15

Various graft copolymer resins (B) were prepared by the following methods using the rubbery polymers and the monomeric mixtures indicated in Table 2.

REFERENTIAL EXAMPLES 7-10 AND 13-15

A 5-liter nitrogen-purged reactor equipped with a stirrer was charged with 1,900 g of pure water, and 50 g of a 20% aqueous solution of sodium rosinate as an emulsifier was added. A polybutadiene (PBD) latex having a solids content of 57.4% was charged in an amount (g) corresponding to the proportion of the rubbery polymer indicated in Table 2. This amount can be calculated in accordance with the following formula.

$$\frac{10 \times PBD\ (\%)}{0.574}.$$

Thereafter, the monomer or monomer mixture indicated in Table 2 was fed in an amount (g) calculated in accordance with the formula $0.3\times[1,000-\{10\times PBD\ (\%)\}]$ together with 0.5 g of tert-dodecylmercaptan and 4 g of tris(nonylphenyl) phosphite. Temperature elevation was started while blowing nitrogen gas into the reactor. When the temperature reached 65° C., 100 g of pure water containing 2 g of potassium persulfate was charged. The temperature was further raised, and when it reached 70° C., the monomer or monomer mixture mentioned above was added at an equal rate over 2.5 hours in an amount (g) calculated by the formula $0.7\times[1,000-\{10\times PBD\ (\%)\}]$. After the addition, the mixture was maintained at the same temperature for 1.5 hours, and then the temperature was raised to 80° C. The mixture was maintained at this temperature for 1 hour to perform emulsion polymerization. After the polymerization, the reaction product was coagulated with magnesium sulfate, washed, dehydrated and dried. Thus, powdery graft copolymer resins (B-1) to (B-4) and (B'-1) to (B'-3) were obtained.

REFERENTIAL EXAMPLES 11-12

A 5-liter nitrogen-purged reactor equipped with a stirrer was charged with EPDM (JSR EP-33, an ethylene/propylene/non-conjugated diene copolymer rubber produced by Japan Synthetic Rubber Co., Ltd.) in the amount (g) calculated from the formula $[10\times EPDM\ (\%)]$, the monomeric mixture shown in Table 2 in the amount (g) calculated from the formula $[1,000-\{10\times EPDM\ (\%)\}]$, 5 g of benzoyl peroxide and 1,200 g of toluene. They were fully dissolved, and the monomers were polymerizaed at 85° C. for 5 hours and then at 100° C. for 1 hour.

After the polymerization, the polymerization product was subjected to steam distillation to remove the solvent and the unreacted monomers. In this manner, grafted copolymer resins (B-5) and (B-6) were obtained.

EXAMPLES 1-12 AND COMPARATIVE EXAMPLES 1-]

Each of the SMAA resins obtained in Referential Examples 1 to 6, each of the graft copolymer resins obtained in Referential Examples 7 to 15 and an organopolysiloxane (TORAY SILICONE SH-200, a trademark for a silicone oil produced by Toray Silicone Co., Ltd.) were blended in the proportions shown in Table 3. As a stabilizer, octadecyl-3-(3,5-di-tert-butyl-4-hydroxyphenyl)propionate was added to the mixture in an amount of 0.2 PHR. The resulting mixture was melt-kneaded and pelletized in an extruder.

The pellets were injection-molded to prepare test specimens. The properties of the test specimens were evaluated, and the results are summarized in Table 3.

TABLE 1

| Referential Example | | 1 | 2 | 3 | 4 | 5 | 6 |
|---|---|---|---|---|---|---|---|
| Proportions of the monomers charged (%) | Styrene | 77 | 85 | 90 | 52 | 60 | 27 |
| | Methacrylic acid | 23 | 15 | 10 | 18 | 40 | 15 |
| | Methyl methacrylate | — | — | — | 30 | — | 58 |
| Designation of SMAA resin (A) | | A-1 | A-2 | A-3 | A-4 | A'-1 | A'-2 |

TABLE 2

| Referential Example | Rubbery polymer Type | Proportion (%) | Mixing ratio of methyl methacrylate to styrene | Designation of the graft copolymer resin (B) |
|---|---|---|---|---|
| 7 | PBD | 40 | 100/0 | B-1 |
| 8 | " | 40 | 80/20 | B-2 |
| 9 | " | 50 | 70/30 | B-3 |
| 10 | " | 70 | 60/40 | B-4 |
| 11 | EPDM | 60 | 50/50 | B-5 |
| 12 | " | 55 | 40/60 | B-6 |
| 13 | PBD | 40 | 10/90 | B'-1 |
| 14 | " | 20 | 80/20 | B'-2 |
| 15 | " | 85 | 60/40 | B'-3 |

TABLE 3

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Blending proportions (parts) | A-1 | 55 | 60 | 70 | 80 | 70 | 65 | 60 | | | | | |
| | A-2 | | | | | | | | 60 | 70 | | | |
| | A-3 | | | | | | | | | | 85 | 60 | |
| | A-4 | | | | | | | | | | | | 60 |
| | A'-1 | | | | | | | | | | | | |
| | A'-2 | | | | | | | | | | | | |
| | B-1 | 45 | | | | | | 40 | | | | | |
| | B-2 | | 40 | | | | | | | | | | |
| | B-3 | | | 30 | | | | | | 40 | | | |
| | B-4 | | | | 20 | | | | | | 15 | | 40 |
| | B-5 | | | | | 30 | | | | | 30 | | |
| | B-6 | | | | | | 35 | | | | | 40 | |
| | B'-1 | | | | | | | | | | | | |
| | B'-2 | | | | | | | | | | | | |
| | B'-3 | | | | | | | | | | | | |
| | Organopolysiloxane | 0.08 | 0.08 | 0.08 | 0.08 | 0.08 | 0.08 | 0.10 | 0.10 | 0.10 | 0.10 | 0.20 | 0.20 |
| Amount of silicon (%) | | 0.03 | 0.03 | 0.03 | 0.03 | 0.03 | 0.03 | 0.04 | 0.04 | 0.04 | 0.04 | 0.08 | 0.08 |
| Properties | | | | | | | | | | | | | |
| Heat distortion temperature (°C.) | | 107 | 108 | 111 | 114 | 110 | 108 | 104 | 102 | 104 | 103 | 95 | 104 |
| Izod impact strength (kg·cm/cm) | | 13 | 11 | 12 | 10 | 12 | 13 | 11 | 15 | 12 | 10 | 11 | 12 |
| MFR (g/10 min.) | | 0.72 | 0.85 | 1.05 | 1.18 | 0.92 | 0.68 | 0.87 | 1.20 | 0.58 | 1.50 | 0.50 | 0.74 |

| | | Comparative Example | | | | | | | | |
|---|---|---|---|---|---|---|---|---|---|---|
| | | 1 | 2 | 3 | 4 | 5 | 6 | 7 | 8 | 9 |
| Blending proportions (parts) | A-1 | | | | | | | | 70 | 60 |
| | A-2 | 8 | 92 | | | 55 | | 80 | | |
| | A-3 | | | | | | 30 | | | |
| | A-4 | | | | | | | | | |
| | A'-1 | | | 55 | | | | | | |
| | A'-2 | | | | 60 | | | | | |
| | B-1 | | | 45 | | | | | | |
| | B-2 | 92 | 8 | | 40 | | | | | 40 |
| | B-3 | | | | | | | | 30 | |
| | B-4 | | | | | | | | | |
| | B-5 | | | | | | | | | |
| | B-6 | | | | | | | | | |
| | B'-1 | | | | | | 45 | | | |
| | B'-2 | | | | | | | 70 | | |
| | B'-3 | | | | | | | | 20 | |
| | Organopolysiloxane | 0.08 | 0.08 | 0.08 | 0.08 | 0.08 | 0.08 | 0.08 | | 0.8 |
| Amount of silicon (%) | | 0.03 | 0.03 | 0.03 | 0.03 | 0.03 | 0.03 | 0.03 | | 0.3 |
| Properties | | | | | | | | | | |
| Heat distortion temperature (°C.) | | 89 | 111 | 113 | 103 | 89 | 88 | 107 | 111 | 105 |
| Izod impact strength (kg·cm/cm) | | 19 | 2 | 6 | 9 | 3 | 10 | 5 | 6 | 11 |
| MFR (g/10 min.) | | 0.37 | 5.21 | 0.32 | 0.20 | 1.15 | 0.95 | 0.73 | 1.02 | 092 |

Analysis of the results given in Table 3 shows the following facts.

The thermoplastic resin composition of this invention has excellent mechanical properties typified by impact strength and a high heat distortion temperature indicating high heat resistance, and its processability is also good.

When the blending ratio between the SMAA resin (A) and the graft copolymer resin (B) falls outside the range specified in this invention (Comparative Examples 1 and 2), the resulting compositions are inferior in either heat resistance (heat distortion temperature) or impact strength and cannot have both of these properties at high levels. When the amount of methacrylic acid in the SMAA resin (A) exceeds 35% (Comparative Example 3), the impact strength of the resulting composition is very low.

when the proportion of methyl methacrylate replacing styrene in the SMAA resin (A) is outside the range specified in this invention (Comparative Example 4), the processability of the resulting composition is drastically reduced.

When the mixing ratio of the monomers in the graft copolymer resin (B) falls outside the range specified in this invention (Comparative Example 5), both the heat distortion temperature and impact strength of the composition are low. If the amount of the rubbery polymer in the resin (B) falls outside the range specified in this invention, the resulting composition has low heat resistance (Comparative Example 6), or insufficient impact strength (Comparative Example 7).

When no organopolysiloxane (C) is added (Comparative Example 8), the impact strength of the resulting composition is low. If the amount of the component (C) exceeds the upper limit specified in this invention (Comparative Example 9), there is no further increase in impact strength.

What we claim is:

1. A thermoplastic resin composition comprising as essential ingredients
   (A) 10 to 90 parts by weight of a styrene-methacrylic acid copolymer resin selected from a styrene/methacrylic acid copolymer resin obtained by polymerizing 97 to 65% by weight of styrene and 3 to 35% by weight of methacrylic acid and a styrene/methyl methacrylate/methacrylic acid copolymer resin obtained by polymerizing 48.6 to 64.9% by weight of styrene, 48.4 to 0.1% by weight of methyl methacrylate and 3 to 35% by weight of methacrylic acid,
   (B) 90 to 10 parts by weight of a graft copolymer resin obtained by polymerizing 70 to 20% by weight of methyl methacrylate or a monomeric mixture composed of from less than 100 to 20% by weight of methyl methacrylate and from more than 0 to 80% by weight of styrene in the presence of 30 to 80% by weight of a rubbery polymer, and
   (C) 0.001 to 0.2% by weight as silicon, based on the total weight of (A) and (B), of an organopolysiloxane.

2. The thermoplastic resin composition according to claim 1 wherein the rubbery composition is a homopolymer of butadiene 3. The composition according to claim 1 wherein the rubbery polymer is a copolymer of butadiene and a vinyl monomer copolymerizable with it.

4. The composition according to claim 1 wherein the rubbery polymer is a homopolymer of an acrylic acid ester.

5. The composition according to claim 1 wherein the rubbery polymer is a copolymer of an acrylic acid ester and a vinyl monomer copolymerizable with it.

6. The composition according to claim 1 wherein the rubbery polymer is an ethylene/propylene/non-conjugated diene copolymer.

7. The composition according to claim 1 wherein the organopolysiloxane (C) is dimethylpolysiloxane.

8. The composition according to claim 1, wherein the styrene/methacrylic acid copolymer resin is obtained by polymerizing 93 to 70% by weight of styrene and 7 to 30% by weight of methacrylic acid in the presence or absence of a polymerization initiator.

9. The composition according to claim 1, wherein the styrene/methyl methacrylate/methacrylic acid copolymer is obtained by polymerizing 50 to 60% by weight of styrene, 43 to 10% by weight of methyl methacrylate and 7 to 30% by weight of methacrylic acid in the presence or absence of a polymerization initiator.

10. The composition according to claim 1 wherein the graft copolymer resin (B) is obtained by polymerizing methyl methacrylate or a monomeric mixture composed of 80 to 40% by weight of methyl methacrylate and 20 to 60% by weight of styrene in the presence of 40 to 70% by weight of a rubbery polymer.

11. The Composition according to claim 1 wherein the organopolysiloxane (C) is a polymer having structural units of the formula

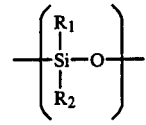

wherein $R_1$ and $R_2$ may be identical or different and each represents an alkyl, aryl or aralkyl group, and is a homopolymer or a random, block or graft copolymer of the above structural units in a combination of two or more types.

12. The composition according to claim 1, wherein the organopolysiloxane (C) is present in an amount of 0.002 to 0.08% by weight as silicon based on the total weight of resins (A) and (B) and has a viscosity of 10 to 100,000 centistokes.

* * * * *